(12) United States Patent
Suetsugu et al.

(10) Patent No.: US 7,920,573 B2
(45) Date of Patent: Apr. 5, 2011

(54) DATA RELAY DEVICE, DATA RELAY METHOD, AND COMPUTER PRODUCT

(75) Inventors: Takahiro Suetsugu, Fukuoka (JP); Hiroshi Kinoshita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 11/845,201

(22) Filed: Aug. 27, 2007

(65) Prior Publication Data

US 2008/0095181 A1 Apr. 24, 2008

(30) Foreign Application Priority Data

Oct. 20, 2006 (JP) ................................. 2006-286855

(51) Int. Cl.
*H04L 12/28* (2006.01)
*H04L 12/56* (2006.01)

(52) U.S. Cl. .................. 370/395.42; 370/412; 370/417; 370/429

(58) Field of Classification Search .................. 370/236, 370/245, 282, 315, 394, 395.3, 395.31, 395.4, 370/395.42, 397, 399, 410, 412, 417, 428, 370/429; 710/100
See application file for complete search history.

(56) References Cited

U.S. PATENT DOCUMENTS

| | | | | |
|---|---|---|---|---|
| 5,165,021 A * | 11/1992 | Wu et al. | ...................... | 709/234 |
| 5,170,473 A * | 12/1992 | Ishida | .......................... | 710/113 |
| 5,233,606 A * | 8/1993 | Pashan et al. | .................. | 370/418 |
| 5,280,481 A * | 1/1994 | Chang et al. | ................... | 370/352 |
| 5,390,173 A * | 2/1995 | Spinney et al. | ................ | 370/393 |
| 5,774,453 A * | 6/1998 | Fukano et al. | ................. | 370/231 |
| 5,796,944 A * | 8/1998 | Hill et al. | ....................... | 709/250 |
| 5,901,147 A * | 5/1999 | Joffe | .............................. | 370/412 |
| 6,104,700 A * | 8/2000 | Haddock et al. | .............. | 370/235 |
| 6,157,654 A * | 12/2000 | Davis | ............................ | 370/412 |
| 6,182,183 B1 * | 1/2001 | Wingard et al. | .............. | 710/305 |
| 6,188,698 B1 * | 2/2001 | Galand et al. | .................. | 370/412 |
| 6,229,789 B1 * | 5/2001 | Simpson et al. | .............. | 370/235 |
| 6,259,698 B1 * | 7/2001 | Shin et al. | .................. | 370/395.7 |
| 6,286,052 B1 * | 9/2001 | McCloghrie et al. | ......... | 709/238 |
| 6,424,622 B1 * | 7/2002 | Fan et al. | ....................... | 370/230 |
| 6,442,172 B1 * | 8/2002 | Wallner et al. | ................. | 370/416 |
| 6,470,016 B1 * | 10/2002 | Kalkunte et al. | ......... | 370/395.41 |
| 6,473,411 B1 * | 10/2002 | Kumaki et al. | ............... | 370/331 |
| 6,480,490 B1 * | 11/2002 | Merchant et al. | ............ | 370/389 |
| 6,487,212 B1 * | 11/2002 | Erimli et al. | .................. | 370/413 |
| 6,504,819 B2 * | 1/2003 | Fowler et al. | ................. | 370/230 |

(Continued)

FOREIGN PATENT DOCUMENTS

JP     2006-121410     5/2006

*Primary Examiner* — Aung S Moe
*Assistant Examiner* — Benjamin Elliott
(74) *Attorney, Agent, or Firm* — Katten Muchin Rosenman LLP

(57) ABSTRACT

A data relay device includes a plurality of transmission ports that constitutes a logical port, and stores therein a MAC learning table and a CoS distribution table. The data relay device reads a MAC address and a CoS value from a frame, and reads a logical-port ID corresponding to the MAC address from the MAC learning table. The data relay device reads a transmission-port ID corresponding to the logical-port ID and the CoS value from the CoS distribution table, and outputs the frame to a transmission port indicated by the transmission-port ID. On the transmission port, the frame is stored in a transmission queue corresponding to the CoS value, and the frame is transmitted at a shaping rate assigned to the transmission queue.

6 Claims, 16 Drawing Sheets

U.S. PATENT DOCUMENTS

| | | | |
|---|---|---|---|
| 6,560,229 B1* | 5/2003 | Kadambi et al. | 370/392 |
| 6,570,876 B1* | 5/2003 | Aimoto | 370/389 |
| 6,611,522 B1* | 8/2003 | Zheng et al. | 370/395.21 |
| 6,667,984 B1* | 12/2003 | Chao et al. | 370/414 |
| 6,687,247 B1* | 2/2004 | Wilford et al. | 370/392 |
| 6,707,817 B1* | 3/2004 | Kadambi et al. | 370/390 |
| 6,721,316 B1* | 4/2004 | Epps et al. | 370/389 |
| 6,732,206 B1* | 5/2004 | Jensen et al. | 710/105 |
| 6,795,870 B1* | 9/2004 | Bass et al. | 710/6 |
| 6,810,037 B1* | 10/2004 | Kalapathy et al. | 370/392 |
| 6,826,189 B1* | 11/2004 | Saito | 370/397 |
| 6,859,438 B2* | 2/2005 | Haddock et al. | 370/235 |
| 6,891,799 B1* | 5/2005 | Hagai et al. | 370/235 |
| 6,993,041 B2* | 1/2006 | Yamamoto | 370/413 |
| 7,020,141 B1* | 3/2006 | Stacey et al. | 370/395.21 |
| 7,130,903 B2* | 10/2006 | Masuda et al. | 709/225 |
| 7,164,687 B2* | 1/2007 | Namihira | 370/412 |
| 7,180,899 B2* | 2/2007 | De Silva et al. | 370/395.31 |
| 7,224,671 B2* | 5/2007 | Lee et al. | 370/235 |
| 7,260,609 B2* | 8/2007 | Fuehrer et al. | 709/207 |
| 7,272,144 B2* | 9/2007 | Cloonan et al. | 370/395.42 |
| 7,286,535 B2* | 10/2007 | Ishikawa et al. | 370/392 |
| 7,336,606 B2* | 2/2008 | Romano et al. | 370/230 |
| 7,339,942 B2* | 3/2008 | Morgan et al. | 370/412 |
| 7,342,889 B2* | 3/2008 | Harrekilde-Petersen et al. | 370/236 |
| 7,397,796 B1* | 7/2008 | Smiljani | 370/390 |
| 7,408,661 B2* | 8/2008 | Hoshino et al. | 358/1.15 |
| 7,424,018 B2* | 9/2008 | Gallatin et al. | 370/389 |
| 7,440,761 B2* | 10/2008 | Matsukura et al. | 455/452.2 |
| 7,457,245 B2* | 11/2008 | McAlpine et al. | 370/230 |
| 7,535,907 B2* | 5/2009 | Hussain et al. | 370/392 |
| 7,583,596 B1* | 9/2009 | Frink | 370/230.1 |
| 7,630,649 B2* | 12/2009 | Oki et al. | 398/177 |
| 7,643,493 B1* | 1/2010 | Sayrafian-Pour | 370/395.4 |
| 2001/0033581 A1* | 10/2001 | Kawarai et al. | 370/468 |
| 2002/0075809 A1* | 6/2002 | Phaal | 370/245 |
| 2002/0181478 A1* | 12/2002 | Shizume | 370/401 |
| 2003/0074420 A1* | 4/2003 | Hoshino et al. | 709/218 |
| 2003/0081624 A1* | 5/2003 | Aggarwal et al. | 370/412 |
| 2003/0112810 A1* | 6/2003 | Nakabayashi et al. | 370/401 |
| 2003/0185249 A1* | 10/2003 | Davies et al. | 370/535 |
| 2003/0189932 A1* | 10/2003 | Ishikawa et al. | 370/392 |
| 2003/0212812 A1* | 11/2003 | Wang et al. | 709/234 |
| 2004/0085964 A1* | 5/2004 | Vaananen | 370/395.4 |
| 2004/0127226 A1* | 7/2004 | Dugad et al. | 455/450 |
| 2004/0179476 A1* | 9/2004 | Kim et al. | 370/230 |
| 2005/0041599 A1* | 2/2005 | Zavalkovsky et al. | 370/252 |
| 2006/0053117 A1* | 3/2006 | McAlpine et al. | 707/10 |
| 2007/0162981 A1* | 7/2007 | Morioka et al. | 726/30 |
| 2007/0189253 A1* | 8/2007 | Choi et al. | 370/338 |
| 2007/0268903 A1* | 11/2007 | Nakagawa | 370/392 |
| 2008/0095181 A1* | 4/2008 | Suetsugu et al. | 370/412 |
| 2008/0130669 A1* | 6/2008 | Loeb et al. | 370/412 |
| 2008/0196033 A1* | 8/2008 | Chen | 718/103 |
| 2009/0046735 A1* | 2/2009 | Regnier et al. | 370/412 |
| 2009/0080447 A1* | 3/2009 | Sawada et al. | 370/401 |
| 2009/0180478 A1* | 7/2009 | Yu et al. | 370/395.1 |

* cited by examiner

FIG.4

CoS DISTRIBUTION TABLE

| LOGICAL PORT | CoS VALUE | TRANSMISSION PORT |
|---|---|---|
| L1 | 0 | P2 |
| | 1 | P1 |
| | 2 | P2 |
| | 3 | P1 |
| | 4 | P2 |
| | 5 | P1 |
| | 6 | P2 |
| | 7 | P1 |

FIG.5

MAC LEARNING TABLE

| DESTINATION MAC ADDRESS | LOGICAL PORT |
|---|---|
| 00-E0-00-00-12-01 | R1 |
| 00-E0-00-00-12-02 | L1 |
| 00-E0-00-00-12-03 | R2 |
| 00-E0-00-00-12-04 | L1 |
| ⋮ | ⋮ |

FIG.6

| CoS VALUE | TRANSMISSION QUEUE |
|---|---|
| 1 | Q1 |
| 3 | Q2 |
| 5 | Q3 |
| 7 | Q4 |

FIG.7

| CoS VALUE | TRANSMISSION QUEUE |
|---|---|
| 0 | Q1 |
| 2 | Q2 |
| 4 | Q3 |
| 6 | Q4 |

FIG.8

| TRANSMISSION QUEUE | SHAPING RATE |
|---|---|
| Q1 | 20 Mbit/sec |
| Q2 | 40 Mbit/sec |
| Q3 | 60 Mbit/sec |
| Q4 | 80 Mbit/sec |

FIG.9

| TRANSMISSION QUEUE | SHAPING RATE |
|---|---|
| Q1 | 10 Mbit/sec |
| Q2 | 30 Mbit/sec |
| Q3 | 50 Mbit/sec |
| Q4 | 70 Mbit/sec |

| | BYTE |
|---|---|
| DESTINATION MAC ADDRESS | 6 |
| SOURCE MAC ADDRESS | 6 |
| VLAN TAG { TPID / PRIORITY / CFI / VLAN ID } | 6 |
| TYPE/LENGTH | 2 |
| PAYLOAD | 40 TO 1500 |
| FCS | 4 |

| CoS VALUE | POLICING RATE |
|---|---|
| 1 | 20 Mbit/sec |
| 3 | 40 Mbit/sec |
| 5 | 60 Mbit/sec |
| 7 | 80 Mbit/sec |

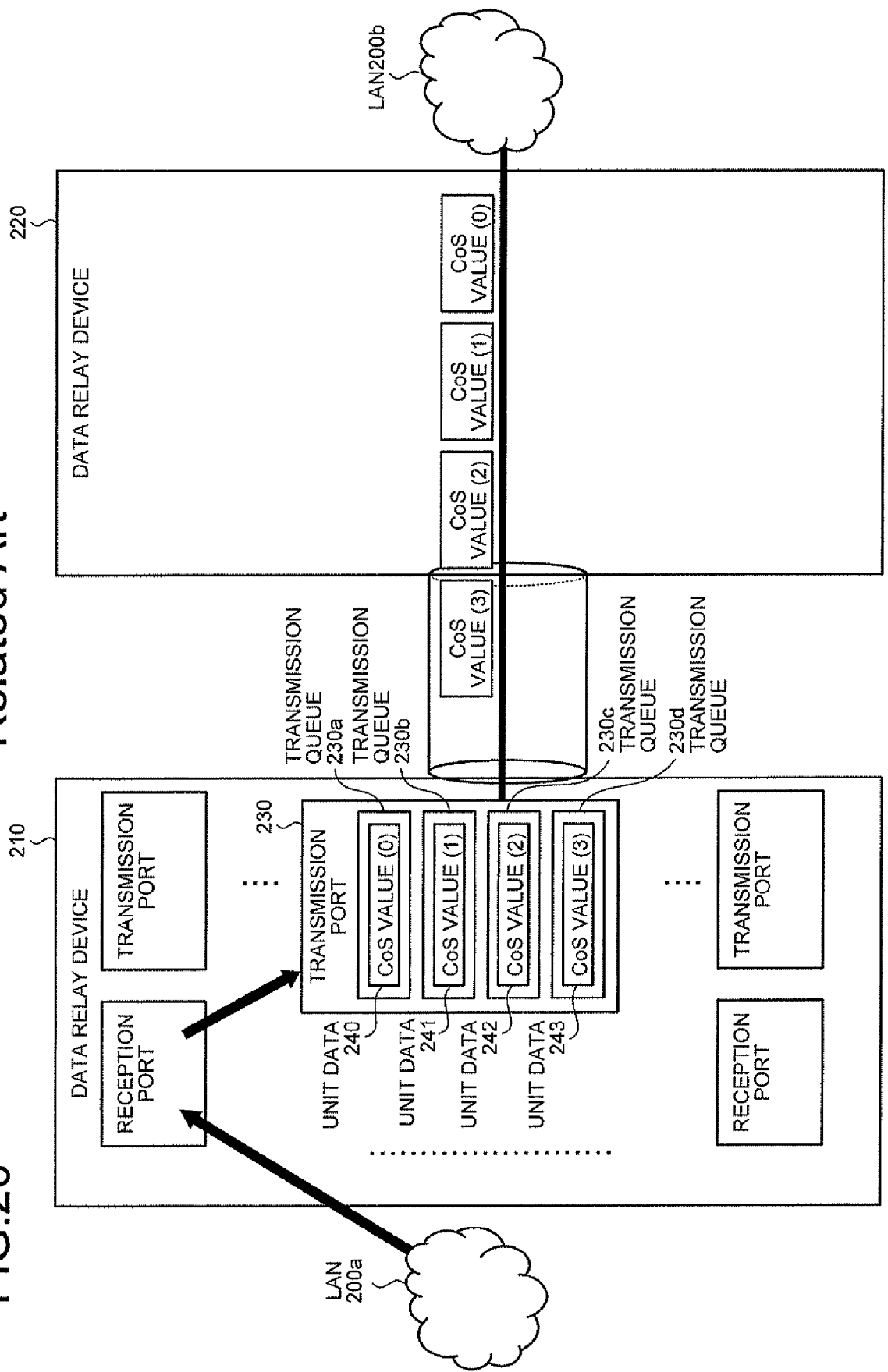

DATA RELAY DEVICE, DATA RELAY METHOD, AND COMPUTER PRODUCT

BACKGROUND OF THE INVENTION

1. Field of the Invention

The present invention relates to a data relay device, a data relay method, and a computer product.

2. Description of the Related Art

In recent years, studies on Quality of Service (QoS) control schemes have been made for controlling network communications while satisfying different classes of communications service required by applications. For example, Japanese Patent Application Laid-open No. 2006-121410 discloses a technology that allows an end-to-end QoS control even for an internet protocol (IP) network including a router that has no resource reservation setup protocol (RSVP).

The QoS control scheme is implemented based on various technologies such as a class of service (CoS) control. Conventional data relay devices have implemented the CoS control by assigning units of data (hereinafter, "frame") to one of a plurality of transmission queues on a transmission port as an egress interface according to priority of the frames. More specifically, upon receipt of a frame, the data relay device outputs the frame to a transmission port exclusively determined by its destination. The data relay device then stores the frame in one of transmission queues on the transmission port, thereby queuing the frames.

FIG. 20 is a schematic diagram of a conventional data relay device. In the example of FIG. 20, frames 240 to 243 each containing a CoS value (0 to 3), i.e., priority value, are transmitted from a local area network (LAN) 200a to a LAN 200b via data relay devices 210 and 220. When the data relay device 210 receives the frames 240 to 243 destined for the LAN 200b on its reception port, a transmission port 230 is exclusively determined by destinations of the frames 240 to 243 as a port through which the frames 240 to 243 are to be forwarded.

The data relay device 210 assigns the frames 240 to 243 to transmission queues 230a to 230d according to their priority, respectively, thereby queuing the frames 240 to 243 to determine the transmission order thereof. The priority of the frames is expressed as: CoS value (0)>CoS value (1)>CoS value (2)>CoS value (3), and hence the priority of the transmission queues is expressed as: transmission queue 230a>transmission queue 230b>transmission queue 230c>transmission queue 230d.

The conventional technology is disadvantageous in that the maximum number of classes of service available in the data relay device cannot exceed the number of the transmission queues on each transmission port, which makes it difficult to extend the classes of service.

For example, as shown in FIG. 20, the data relay device 210 has only four transmission queues on the transmission port 230. Therefore, the maximum number of available service classes is four. To provide eight service classes, building another data relay device having eight transmission queues on a transmission port is required, by which easy extension of the service classes is impeded.

SUMMARY OF THE INVENTION

It is an object of the present invention to at least partially solve the problems in the conventional technology.

According to an aspect of the present invention, a data relay device includes a reception port for receiving data that contains a destination address indicating a destination of the data and a priority value indicating priority of the data, a plurality of transmission ports that constitutes a logical port, and, upon receiving the data from the reception port, that assigns the data to one of a plurality of transmission queues based on the priority value and controls transmission of the data from the transmission queue based on the priority value, a first storage unit that stores therein a first association table that contains a logical-port identification for identifying the logical port in association with priority values and transmission-port identifications for identifying the transmission ports, in which the logical port is divided into classes of a number equal to or smaller than the number of the transmission queues, and the classes are each assigned a different one of the priority values and one of the transmission-port identifications, a second storage unit that stores therein a second association table that contains a destination address of data in association with a logical-port identification for identifying a logical port through which the data is to be forwarded, and an output unit that reads the destination address and the priority value from the data received on the reception port, reads a logical-port identification associated with the destination address from the second association table, reads a transmission-port identification associated with the logical-port identification and the priority value from the first association table, and outputs the data to a transmission port corresponding to the transmission-port identification.

According to another aspect of the present invention, a data relay method for relaying data received on a reception port, which contains a destination address indicating a destination of the data and a priority value indicating priority of the data, includes grouping a plurality of transmission ports that includes a plurality of transmission queues to form a logical port, storing a first association table that contains a logical-port identification for identifying the logical port in association with priority values and transmission-port identifications for identifying the transmission ports, in which the logical port is divided into classes of a number equal to or smaller than the number of the transmission queues, and the classes are each assigned a different one of the priority values and one of the transmission-port identifications, storing a second association table that contains a destination address of data in association with a logical-port identification for identifying a logical port through which the data is to be forwarded, reading the destination address and the priority value from the data received on the reception port, reading a logical-port identification associated with the destination address from the second association table, reading a transmission-port identification associated with the logical-port identification and the priority value from the first association table, outputting the data to a transmission port corresponding to the transmission-port identification, assigning the data to one of the transmission queues based on the priority value, and controlling transmission of the data from the transmission queue based on the priority value.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of a CoS distribution table stored in a CoS-distribution-table storage unit shown in FIG. 2;

FIG. 5 is an example of contents of a media access control (MAC) learning table stored in a MAC-learning-table storage unit shown in FIG. 2;

FIG. 6 is an example of settings for a priority controller in a transmission port (P1) shown in FIG. 3;

FIG. 7 is an example of settings for a priority controller in a transmission port (P2) shown in FIG. 3;

FIG. 8 is an example of settings for a shaper in the transmission port (P1);

FIG. 9 is an example of settings for a shaper in the transmission port (P2);

FIG. 20 is a schematic diagram of a conventional data relay device.

DETAILED DESCRIPTION OF THE PREFERRED EMBODIMENTS

Exemplary embodiments of the present invention are explained in detail below with reference to the accompanying drawings.

Figure 1:
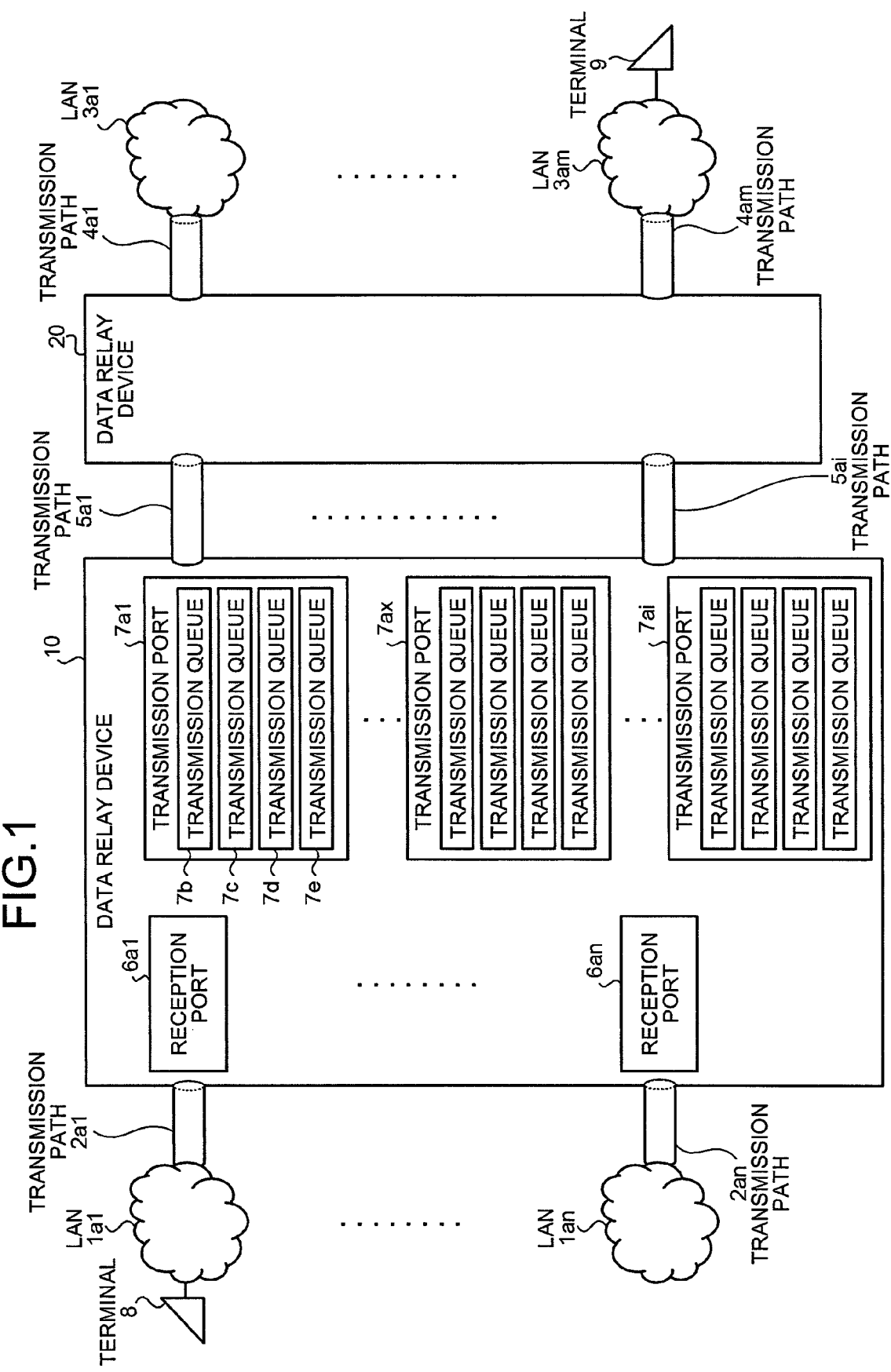
FIG. 1 is a schematic diagram of a data relay device according to a first embodiment of the present invention.

FIG. 1 is a schematic diagram of a data relay device 10 according to a first embodiment of the present invention. In FIG. 1, the data relay device 10 is connected to a plurality of LANs 1a1 to 1an via transmission paths 2a1 to 2an, respectively. Similarly, another data relay device 20 is connected to a plurality of LANs 3a1 to 3am via transmission paths 4a1 to 4am, respectively. The data relay devices 10 and 20 are connected to each other via a plurality of transmission paths 5a1 to 5ai, and form a network. The data relay device 10 includes a plurality of reception ports 6a1 to 6an and a plurality of transmission ports 7a1 to 7ai. Upon receipt of data transmitted through the transmission paths 2a1 to 2an from the LANs 1a1 to 1an on one of the reception ports 6a1 to 6an, the data relay device 10 forwards the data through one of the transmission ports 7a1 to 7ai. For example, upon receipt of data destined for a terminal 9 from a terminal 8 on the reception port 6a1, the data relay device 10 forwards the data through the transmission port 7ax.

The reception port also receives data that contains a destination address indicating a destination of the data and a priority value indicating a priority of the same. The destination address is, e.g., a media access control (MAC) address of the terminal 8 or 9 in a wide-area Ethernet® network. The priority value is, e.g., a CoS value in a QoS-based wide-are Ethernet. Both the MAC address and CoS value are contained in a frame, which is a unit data element in the wide-area Ethernet. When, for example, four classes of service are provided, any one of CoS values "0" to "3" is assigned to a frame as its CoS value.

On the transmission port, the data is allocated to one of the transmission queues according to its priority value, and data transmission from the transmission port is controlled according to the priority values of the transmission queues. For example, the CoS values "0", "1", "2", and "3" are associated with four transmission queues 7b, 7c, 7d, and 7e, respectively, on the transmission port 7a1, and data transmission from the transmission port 7a1 is performed at a shaping rate that is determined by the priority of the CoS value assigned to each transmission queue. More specifically, each time a CoS value is read from a frame received on the transmission port 7a1, the frame is stored in a transmission queue associated with the CoS value. Thus, the frames are thus accumulated in the transmission queues, and each frame is shaped at a shaping rate assigned to the priority of the CoS value to thus implement QoS. The CoS value and the rate assigned to each transmission queue can be changed as required.

The salient feature of the data relay device 10 is its facilitating easy extension of the classes of service. This feature is briefly described with reference to FIG. 2. The data relay device 10 stores therein a priority-transmission port association table that contains logical-port identifications (IDs) each uniquely identifying a logical port formed by integrating two or more transmission ports. The priority-transmission port association table further contains, for each logical port, transmission-port IDs and priority values of data in an associated manner. The logical port is divided into classes of a number equal to or smaller than the total number of transmission queues included in the plurality of transmission ports in the logical port. One of the priority values is assigned to each class such that each class has a different priority value. The transmission-port IDs are provided in a number equal to or smaller than the number of transmission queues in a transmission port. One of the transmission-port IDs is assigned to each class for uniquely identifying a corresponding transmission port.

Figure 2:
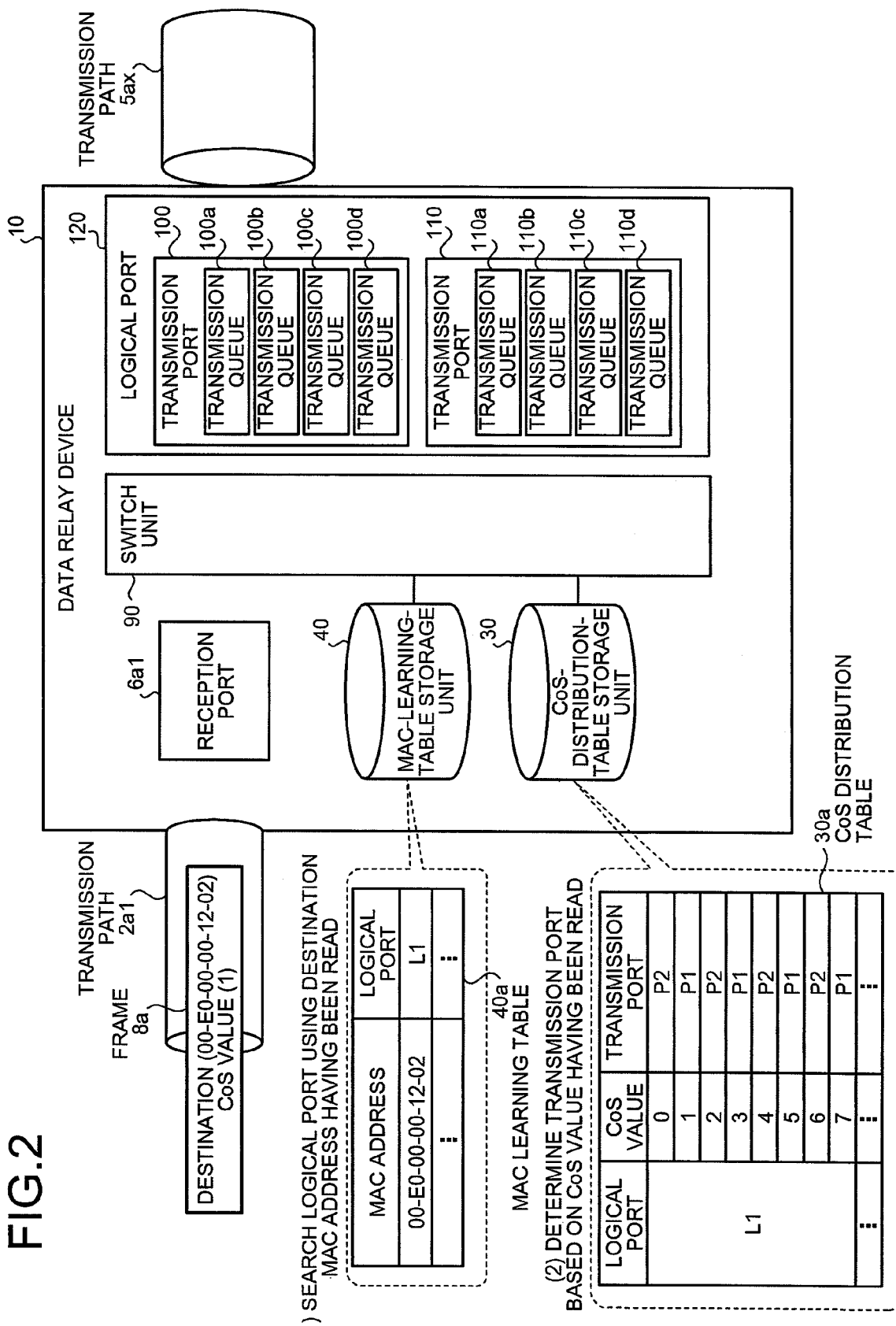
FIG. 2 is a schematic diagram for explaining salient features of the data relay device shown in FIG. 1.

For example, as shown in FIG. 2, the data relay device 10 includes a CoS-distribution-table storage unit 30 that stores therein a CoS distribution table 30a. The CoS distribution table 30a is divided into eight classes, the number of which is not greater than the total number of transmission queues 100a to 100d and 110a to 110d, i.e., eight, in a logical port 120 formed by integrating a transmission port 100 and a transmission port 110 together. Each class is associated with a logical-port ID. In a portion of the CoS distribution table 30a associated with the logical-port ID "L1", CoS values "0" to "7" are assigned to the eight classes. The CoS distribution table 30a associates the CoS values "1", "3", "5", and "7" with an ID "P1" indicating the transmission port 100, and the CoS values "0", "2", "4", and "6" with an ID "P2" indicating the transmission port 110. On the transmission ports 100 and 110, the transmission queues 100a, 100b, 100c, and 100d are associated with the CoS value "1", "3", "5", and "7", respectively, and the transmission queues 110a, 110b, 110c, and 110d are associated with the CoS value "0", "2", "4", and "6", respectively, to conform to the CoS distribution table 30a.

The data relay device 10 also stores therein a destination-logical port association table. In the destination-logical port association table, a destination address of data is associated with a logical-port ID that identifies a logical port where the data is to be sent. Specifically, in the example shown in FIG. 2, the data relay device 10 includes a MAC-learning-table storage unit 40 that stores therein a MAC learning table 40a, in which a MAC address "00-E0-00-00-12-02" indicating the terminal 9 is associated with the ID "L1" indicating the logical port 120.

Upon receipt of data on the reception port, the data relay device 10 reads a destination address and a priority value from the data, reads a logical-port ID associated with the destination address from the destination-logical port association table, reads a transmission-port ID associated with the logical-port ID and the priority value from the priority-transmission port association table, and outputs the data to the transmission port indicated by the transmission-port ID.

For example, as shown in FIG. 2, the data relay device 10 reads the MAC address "00-E0-00-00-12-02" and the CoS value "1" from a frame 8a received on the reception port 6a1 using a switch unit 90. The data relay device 10 then reads the logical-port ID "L1" associated with the MAC address "00-E0-00-00-12-02" from the MAC learning table 40a (see (1) of FIG. 2) and the transmission-port ID "P1" from the CoS distribution table 30a (see (2) of FIG. 2), and outputs the frame 8a to the transmission port 100 indicated by the transmission-port ID "P1". Upon receipt of the frame 8a, the transmission port 100 reads the CoS value "1" and stores it in the transmission queue 100a associated therewith. The data relay device 10 outputs the frame 8a to the transmission path 5ax while controlling data transmission at a preset shaping rate.

As described above, the data relay device 10 controls data transmission from the logical port according to the priority values assigned to the transmission queues in the logical port, thereby allowing easy extension of the classes of service. More specifically, in the first embodiment, the maximum number of service classes available on each of the transmission ports 100 and 110 each having four transmission queues is no greater than four. However, the logical port 120 formed by integrating the transmission ports 100 and 110 together has eight transmission queues, therefore provides eight service classes at the maximum. Hence, the need of building another transmission port is eliminated, which allows easy extension of the classes of service.

Figure 3:
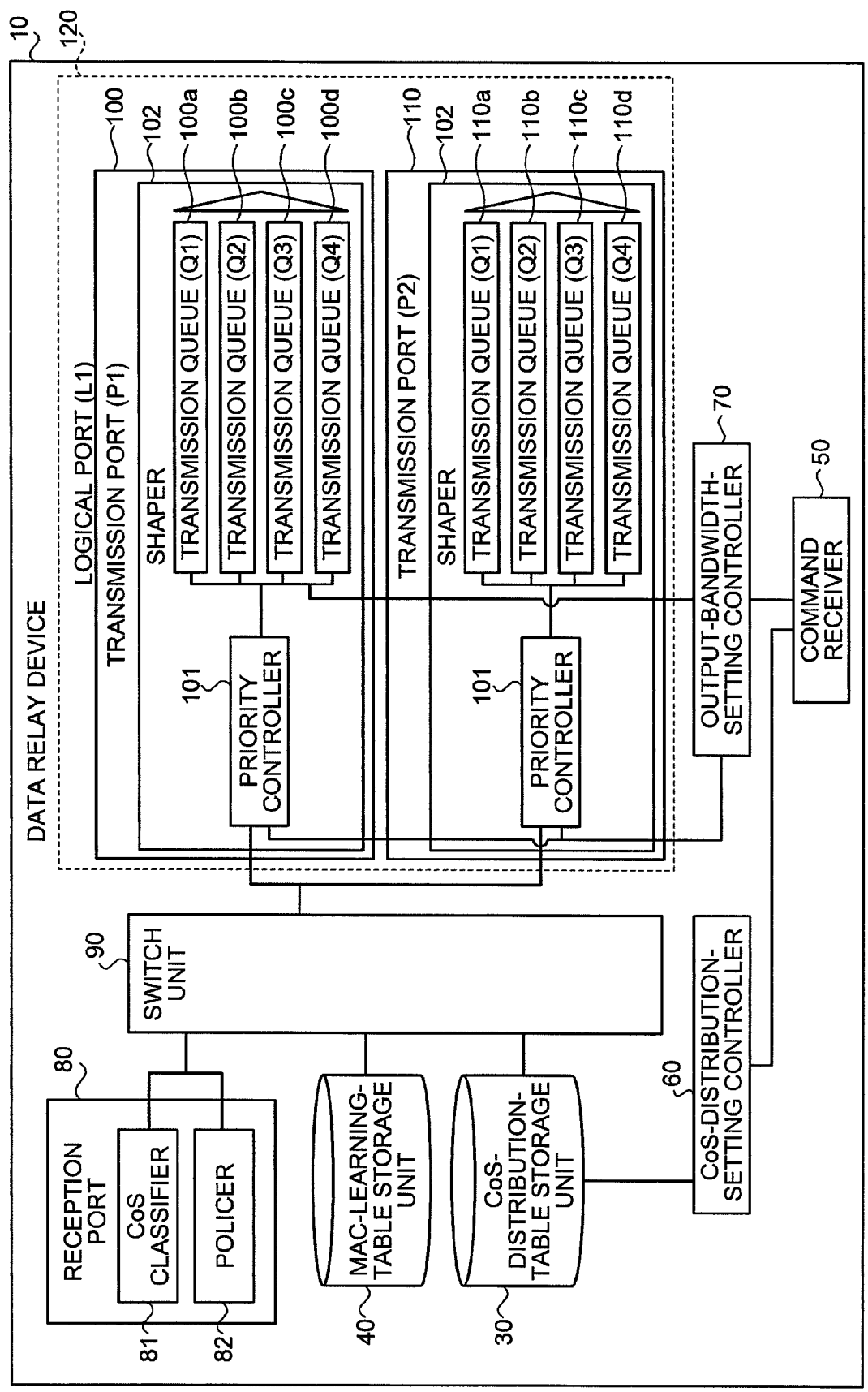
FIG. 3 is a block diagram of the data relay device shown in FIG. 1.

FIG. 3 is a block diagram of the data relay device 10. The data relay device 10 includes the CoS-distribution-table storage unit 30, the MAC-learning-table storage unit 40, a command receiver 50, a CoS-distribution-setting controller 60, an output-bandwidth-setting controller 70, a reception port 80, the switch unit 90, the transmission port 100, and the transmission port 110. The reception port 80 includes a CoS classifier 81 and a policer 82 therein. The transmission port 100 includes a priority controller 101 and a shaper 102 having the four transmission queues 100a to 100d. Similarly, the transmission port 110 includes another priority controller 101 and another shaper 102 having the four transmission queues 110a to 110d. The data relay device 10 recognizes the transmission ports 100 and 110 as the logical port 120. Although not shown in FIG. 3, the data relay device 10 includes, in addition to the reception port 80 and the transmission ports 100 and 110, a plurality of reception ports and transmission ports.

The CoS-distribution-table storage unit 30 stores therein the CoS distribution table that contains logical-port IDs each uniquely identifying a logical port formed by integrating two or more transmission ports. In the CoS distribution table, each logical port is divided into classes of a number equal to or smaller than the total number of transmission queues included in the plurality of transmission ports in the logical port. Transmission-port IDs of a number equal to or smaller than the number of transmission queues in each transmission port are associated with priority values of frames. One of the priority values is assigned to each class such that each class has a different priority value. One of the transmission-port IDs is assigned to each class for uniquely identifying a corresponding transmission port.

More specifically, the CoS-distribution-table storage unit 30 stores therein the CoS distribution table, in which settings related to extension of the classes of service are registered by the CoS-distribution-setting controller 60, described later. FIG. 4 is an example of contents of a CoS distribution table stored in the CoS-distribution-table storage unit 30. As shown in FIG. 4, a portion of the CoS distribution table that is classified into eight classes is associated with the ID "L1" indicating the logical port 120. The number of the classes, i.e., eight, is not greater than the total number of the transmission queues 100a to 100d and 110a to 110d. The CoS values "0" to "7" are assigned to the eight classes. Of the CoS values, odd values are associated with the ID "P1" indicating the transmission port 100, and even values are associated with the ID "P2" indicating the transmission port 110. That is, the transmission-port IDs are cyclically assigned in order of the priority values.

The MAC-learning-table storage unit 40 stores therein the MAC learning table. In the MAC learning table, a destination address of a frame is associated with a logical-port ID that identifies a logical port through which the frame is to be forwarded.

More specifically, the MAC-learning-table storage unit 40 stores therein the MAC learning table in advance. FIG. 5 is an example of contents of the MAC learning table. In the MAC learning table, as shown in FIG. 5, a destination address is associated with a logical-port ID. The destination address is a MAC address of a terminal in the LANs 1a1 to 1an and the LANs 3a to 3am shown in FIG. 1, and is contained in a frame to be transmitted to the terminal. The logical-port ID identifies a logical port, through which the frame is forwarded. In the example shown in FIG. 5, the MAC-learning-table storage unit 40 stores therein the MAC learning table, in which a destination MAC address "00-E0-00-00-12-01" is associated with a logical-port ID "R1".

The command receiver 50 receives a command and sends it to a corresponding unit. More specifically, upon receipt of a command from an operator that specifies a setting for extension of the service class, the command receiver 50 examines the setting and sends it to one of the CoS-distribution-setting controller 60 and the output-bandwidth-setting controller 70, described later. More specifically, when the setting is about selection of a plurality of transmission ports to be integrated into a logical port, the command receiver 50 sends the setting to the CoS-distribution-setting controller 60. When the setting is about the priority controller 101 (described later), such as selection of a transmission port and a CoS value to be associated with each other, or about the shaper 102 (described later), such as determination of a shaping rate for each transmission queue, the command receiver 50 sends the setting to the output-bandwidth-setting controller 70.

The CoS-distribution-setting controller 60 registers the setting in the CoS distribution table. More specifically, upon receipt of the setting from the command receiver 50, the CoS-distribution-setting controller 60 registers the setting in the CoS distribution table stored in the CoS-distribution-table storage unit 30.

The output-bandwidth-setting controller 70 enters the setting to a corresponding unit. More specifically, upon receipt of the setting from the command receiver 50, the output-bandwidth-setting controller 70 determines whether the setting is for the priority controller 101 or for the shaper 102, and updates either the priority controller 101 or the shaper 102 according to the setting.

FIG. 6 is an example of settings for the priority controller 101 in the transmission port (P1) 100. FIG. 7 is an example of settings for the priority controller 101 in the transmission port (P2) 110. For example, as shown in FIGS. 6 and 7, the output-bandwidth-setting controller 70 registers the CoS value "1" with a transmission-queue ID "Q1" associated therewith in a CoS value-transmission-queue ID association table in the priority controller 101 in the transmission port 100. Similarly, the output-bandwidth-setting controller 70 registers the CoS value "0" with the transmission-queue ID "Q1" associated therewith in such an association table in the priority controller 101 in the transmission port 110.

FIG. 8 is an example of settings for the shaper 102 in the transmission port (P1) 100. FIG. 9 is an example of settings for the shaper 102 in the transmission port (P2) 110. In the example shown in FIGS. 8 and 9, the output-bandwidth-setting controller 70 registers the ID "Q1" with a shaping band "20 Mbit/sec" associated therewith in a transmission-queue ID-shaping rate association table in the shaper 102 in the transmission port 100. Similarly, the output-bandwidth-setting controller 70 registers the ID "Q1" with the shaping band "10 Mbit/sec" associated therewith in such an association table in the shaper 102 in the transmission port 110.

Figures 10, 11:
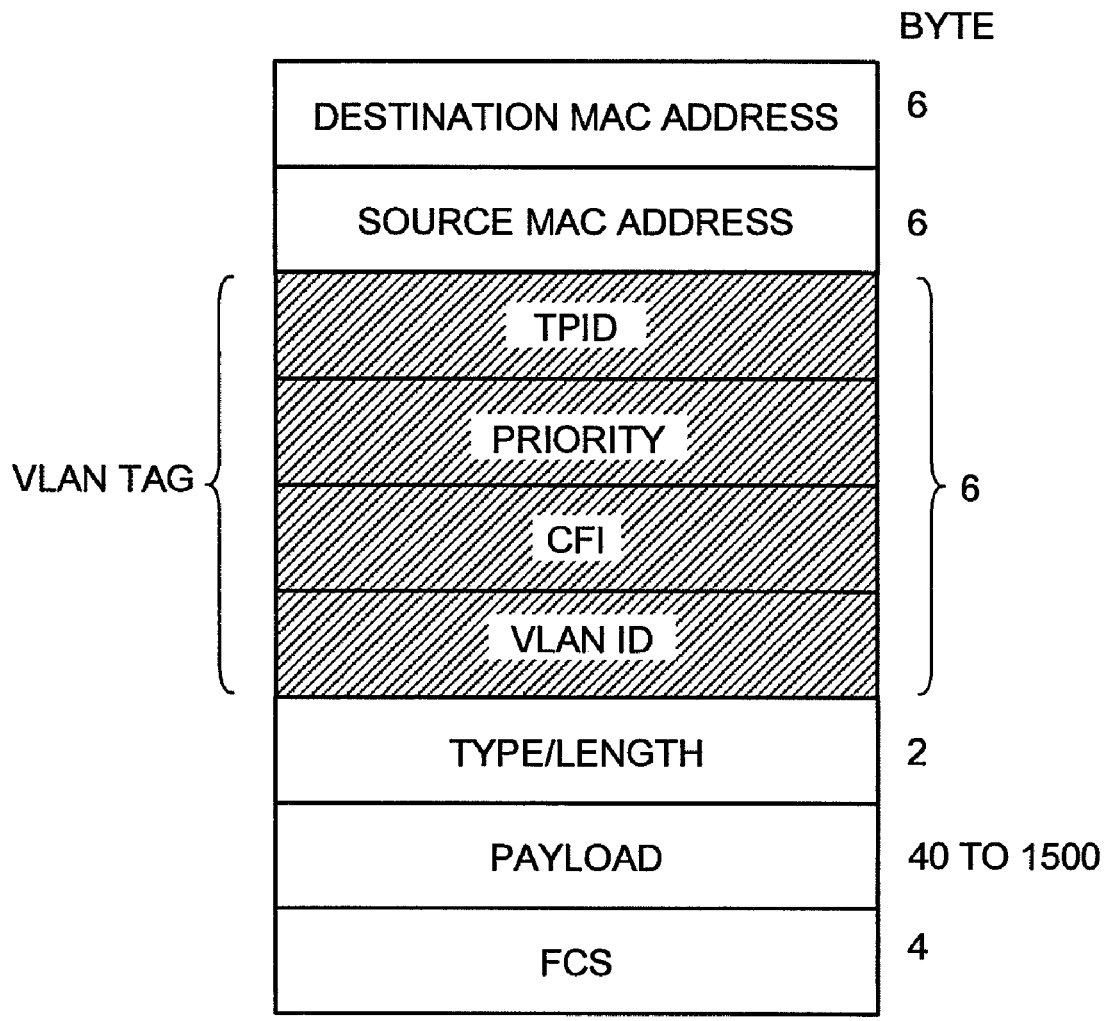
FIG. 10 is an example of a frame format.
FIG. 11 is an example of settings for a policer shown in FIG. 3.

The reception port 80 receives data that contains a destination address indicating a destination of the data and a priority value indicating a priority of the same. More specifically, the reception port 80 has a structure that allows physical connection with a connector of a cable that actually forms the transmission path to receive a frame that contains the destination address and the priority value, and outputs the data to the CoS classifier 81 or the policer 82, described later. The reception port 80 receives a frame in such a frame format as shown in FIG. 10.

Upon receipt of the data from the reception port 80, the CoS classifier 81 sends the data to the switch unit 90, described later. In the network shown in FIG. 1, while the CoS classifier 81 operates when the data relay device 10 receives data transmitted from the terminal 8 to the terminal 9, the CoS classifier 81 does not operate when the data relay device 20 receives the data from the data relay device 10. In the above example, the CoS classifier 81 sends data to the switch unit 90 with a CoS value (corresponding to "PRIORITY" in the frame format shown in FIG. 10) contained in the frame not converted into a CoS value of a receiving side. Alternatively, the CoS classifier 81 can send data to the switch unit 90 with a CoS value of a transmitting side converted into a CoS value of the receiving side.

Upon receipt of the data from the reception port 80, the policer 82 performs policing of the data, and sends the data to the switch unit 90. In the network shown in FIG. 1, in contrast with the CoS classifier 81, the policer 82 does not operate when the data relay device 10 receives the data transmitted from the terminal 8 to the terminal 9. The policer 82 operates when the data relay device 20 receives the data from the data relay device 10. FIG. 11 is an example of settings for the policer 82. As shown in FIG. 11, the policer 82 in the data relay device 20 stores therein a table, in which a policing rate is associated with a CoS value of data to be received on the reception port 80. Hence, the policer 82 performs policing of the data based on the table, and sends the data to the switch unit 90.

Upon receipt of data from the reception port 80, the switch unit 90 reads the destination address and the priority value from the frame, and reads the logical-port ID associated with the destination address from the MAC learning table stored in the MAC-learning-table storage unit 40. The switch unit 90 then reads the transmission-port ID associated with the logical-port ID and the priority value from the CoS distribution table stored in the CoS-distribution-table storage unit 30, and outputs the data received on the reception port 80 to the transmission port indicated by the transmission-port ID.

For example, when the switch unit 90 reads the MAC address "00-E0-00-00-12-02" and the CoS value "1" from a frame contained in data received on the reception port 80, the switch unit 90 reads the logical-port ID "L1" from the MAC learning table stored in the MAC-learning-table storage unit 40 (see FIG. 5). The switch unit 90 then reads the transmission-port ID "P1" from the CoS distribution table stored in the CoS-distribution-table storage unit 30 based on the logical-port ID "L1" and the CoS value "1" (see FIG. 4), and outputs the frame to the transmission port 100 indicated by the transmission-port ID "P1".

The transmission port 100 (110) allocates each frame to one of the transmission queues according its priority value, and controls data transmission according to the priority values assigned to the transmission queues. More specifically, upon receipt of the data from the switch unit 90, the transmission port 100 (110) controls data transmission using the priority controller 101 or the shaper 102. The transmission port 100 (110) has a structure that allows physical connection with a connector of a cable that actually forms the transmission path, thereby outputting the data to the data relay device 20.

The priority controller 101 allocates each frame to one of the transmission queues according to its priority value. More specifically, upon receipt of a frame from the switch unit 90, the priority controller 101 reads the priority value from the frame, and outputs the frame to one of the transmission queues according to settings registered by the output-bandwidth setting controller 70. For example, when the CoS value "1" is read from the frame, the priority controller 101 outputs the frame to the transmission queue 100a indicated by the ID "Q1" (see FIG. 6).

The shaper 102 controls data transmission according to the priority values assigned to the transmission queues. More specifically, when a frame is stored in one of the transmission queues 100a to 100d, the shaper 102 controls data transmission according to the priority values assigned to the transmission queues based on settings registered by the output-bandwidth-setting controller 70. Similarly, on the transmission port 110, when a frame is stored in one of the transmission queues 110a to 110d, the shaper 102 controls data transmission according to the priority values assigned to the transmission queues based on settings registered by the output-bandwidth-setting controller 70. Meanwhile, by setting shaping rates for the shaper 102 in the transmission port 100 and that in the transmission port 110 as shown in FIG. 8 or 9, provisioning of eight classes of service is attained.

The operation of the data relay device 10 is described with reference to FIGS. 12 and 13.

Figure 12:
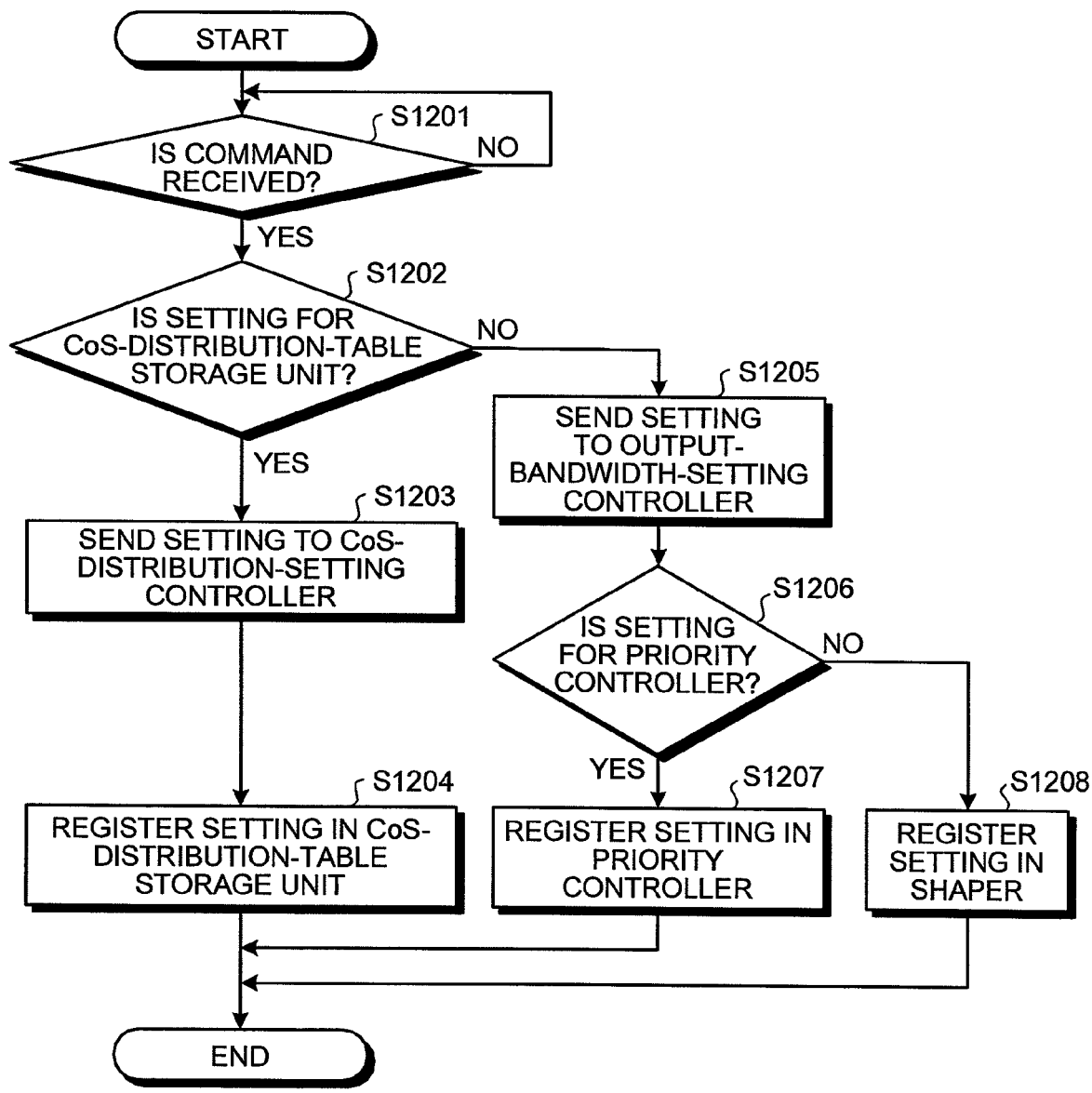
FIG. 12 is a flowchart of a process procedure to register a setting according to the first embodiment.

FIG. 12 is a flowchart of a process procedure to register a setting. Upon receipt of a command that specifies a setting (YES at step S1201), the command receiver 50 determines whether the setting is for the CoS-distribution-table storage unit 30 (step S1202). When the setting is for the CoS-distribution-table storage unit 30 (YES at step S1202), the command receiver 50 sends the setting to the CoS-distribution-setting controller 60 (step S1203). The CoS-distributionsetting controller 60 registers various sets of information based on the setting in the CoS-distribution-table storage unit 30 (step S1204).

When the setting is not for the CoS-distribution-table storage unit 30 (NO at step S1202), the command receiver 50 sends the setting to the output-bandwidth-setting controller 70 (step S1205). The output-bandwidth-setting controller 70 determines whether the setting is for the priority controller 101 (step S1206). When the setting is for the priority controller 101 (YES at step S1206), the output-bandwidth-setting controller 70 registers various sets of information based on the setting in the priority controller 101 (step S1207). When the setting is not for the priority controller 101 (NO at step S1206), the setting is for the shaper 102. Hence, the output-bandwidth-setting controller 70 registers various sets of information based on the setting in the shaper 102 (step S1208), and the process ends.

Figure 13:
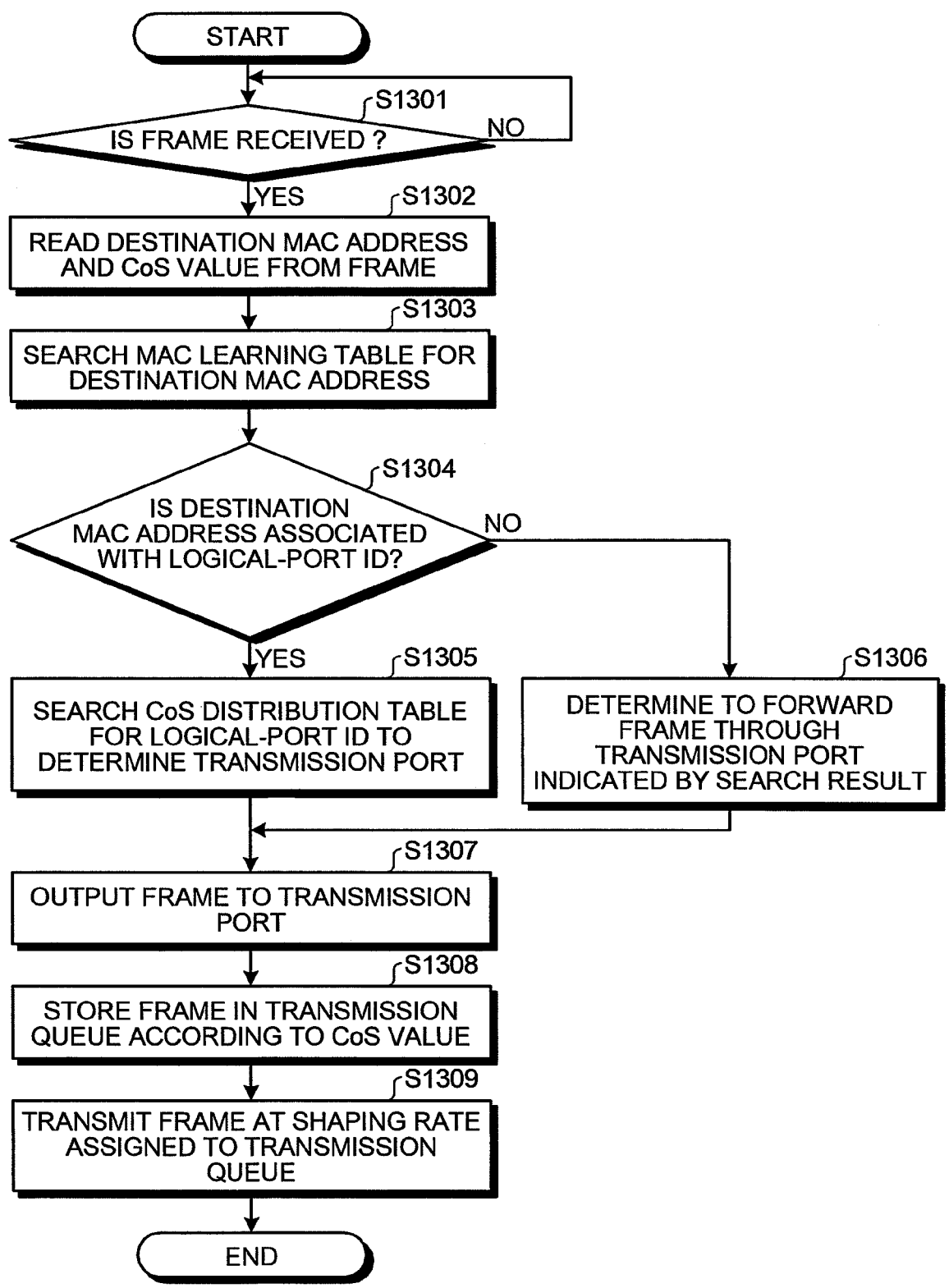
FIG. 13 is a flowchart of a process procedure for frame transmission/reception according to the first embodiment.

FIG. 13 is a flowchart of a process procedure for frame transmission/reception. When the reception port 80 receives a frame (YES at step S1301), the CoS classifier 81 sends the frame to the switch unit 90. Upon receipt of the frame, the switch unit 90 reads a destination MAC address and a CoS value from the frame (step S1302), and searches the MAC learning table stored in the MAC-learning-table storage unit 40 for the destination MAC address (step S1303).

From a result of the search through the MAC learning table, the switch unit 90 determines whether the ID associated with the destination MAC address is a logical-port ID (step S1304). When the ID associated with the destination MAC address is a logical-port ID (YES at step S1304), the switch unit 90 searches the CoS distribution table stored in the CoS-distribution-table storage unit 30 for the logical-port ID to determine a transmission port through which the frame is to be forwarded (step S1305). When the ID associated with the destination MAC address is determined to be a transmission-port ID as the result of the search through the MAC learning table (NO at step S1304), the switch unit 90 determines that the frame is to be forwarded through the transmission port indicated by the ID without the search through the CoS distribution table (step S1306).

Having determined the transmission port through which the frame is to be forwarded with or without the search through the CoS distribution table, the switch unit 90 outputs the frame to the transmission port (step S1307). The priority controller 101 in the transmission port stores the frame in one of transmission queues according to the CoS value contained in the frame (step S1308). The shaper 102 in the transmission port transmits the frame at a shaping rate assigned to the transmission queue (step S1309), and the process ends.

As described above, according to the first embodiment, the data relay device stores therein the CoS distribution table that contains logical-port IDs, each of which uniquely identifies a logical port. The CoS distribution table also contains, for each logical port formed by integrating two or more transmission ports, transmission-port IDs and CoS values of frames. The logical port is divided into classes of a number equal to or smaller than the total number of transmission queues included in the plurality of transmission ports in the logical port. One of the CoS values is assigned to each class such that each class has a different CoS value. The transmission-port IDs are provided in a number equal to or smaller than that of transmission queues included in each transmission port, and one of the transmission-port IDs is assigned to each class for uniquely identifying a corresponding transmission port among the transmission ports. The data relay device also stores therein the MAC learning table that contains a logical-port ID associated with a MAC address of a frame. The logical-port ID identifies a logical port through which the frame is to be forwarded. Upon receipt of data on the reception port, the MAC address and the CoS value are read from the frame. The logical-port ID associated with the MAC address is read from the MAC learning table, and the transmission-port ID associated with the logical-port ID and the CoS value is read from the CoS distribution table. The data received on the reception port is output to the transmission port indicated by the transmission-port ID. Thus, data transmission is controlled according to the priority values assigned to the transmission queues in the logical port, which allows easy extension of the classes of service.

In the CoS distribution table, the transmission-port IDs are cyclically assigned in order of the CoS values. This allows easy extension of the classes of service while exactly following the priorities.

In the first embodiment, a destination address of a terminal in a network and a logical-port ID indicating a logical port through which a frame is to be forwarded are associated with each other and registered in the MAC learning table in advance. According to a second embodiment of the present invention, during the course of data transmission and reception, a destination address and a logical-port ID are associated with each other and registered in the MAC learning table to thus be accumulated therein.

Figure 14:
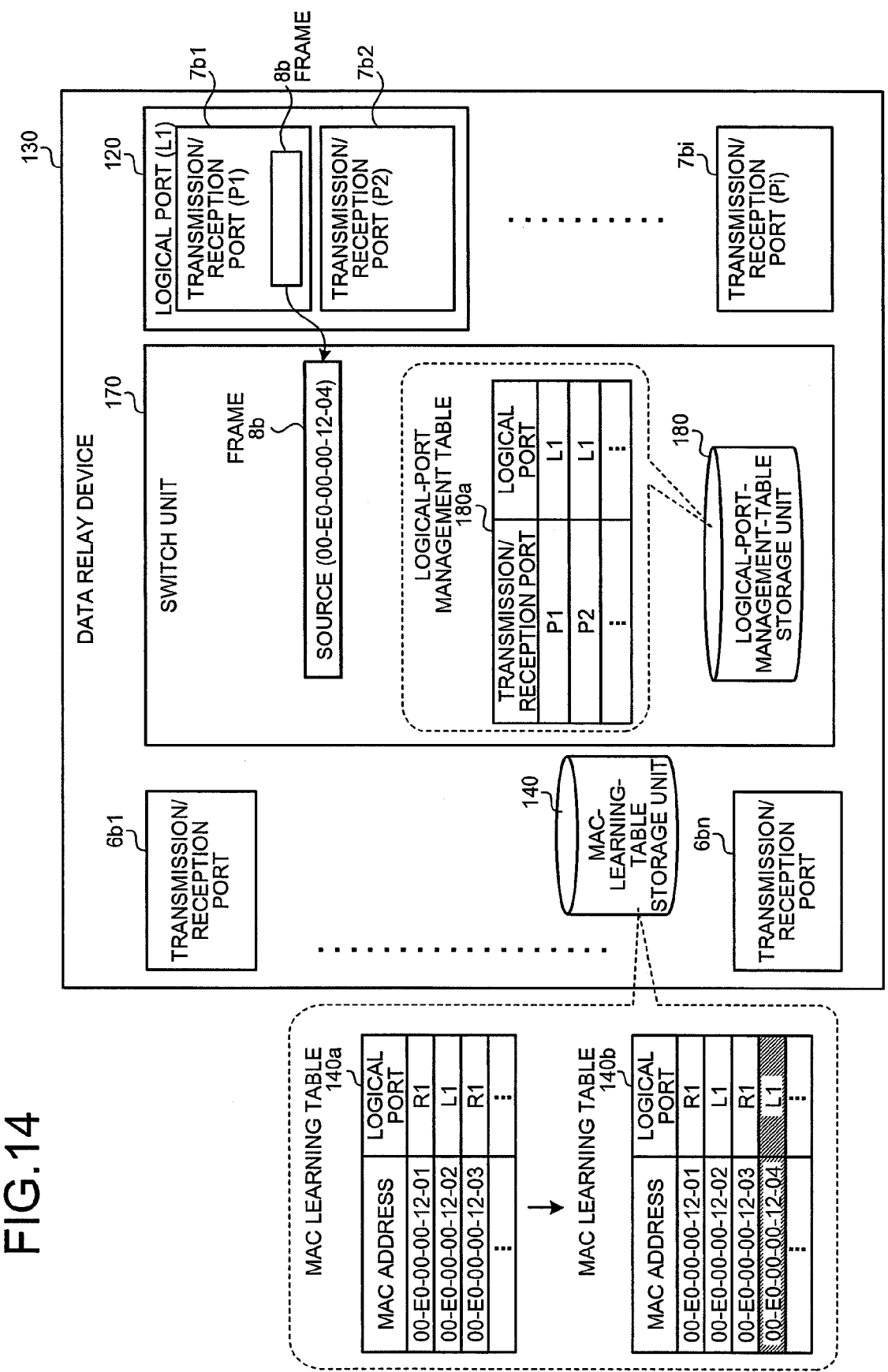
FIG. 14 is a schematic diagram of a data relay device according to a second embodiment of the present invention.

FIG. 14 is a schematic diagram of a data relay device 130 according to the second embodiment. As shown in FIG. 14, the data relay device 130 relays data through transmission/reception ports 6b1 to 6bn (through which data is transmitted to and received from a plurality of LANs) and transmission/reception ports 7b1 to 7bi (through which data is transmitted to and received from another data relay device). While the transmission/reception ports 7b1 to 7bi correspond to the transmission ports 7a1 to 7ai in the first embodiment, the transmission/reception ports 7b1 to 7bi of the second embodiment function also as reception ports to receive data. Similarly, while the transmission/reception ports 6b1 to 6bn correspond to the reception ports 6a1 to 6an in the first embodiment, the transmission/reception ports 6b1 to 6bn of the second embodiment function also as transmission ports to transmit data.

The salient feature of the data relay device 130 is its facilitating creation of a table in which destination addresses and logical-port IDs are associated with each other. This feature is briefly described. The data relay device 130 stores therein a logical-port management table that contains, for each logical port formed by integrating two or more transmission/reception ports, transmission/reception-port IDs and the logical-port IDs associated with each other. Each transmission/reception-port ID uniquely identifies a transmission/reception port, and each logical-port ID uniquely identifies a logical port.

For example, as shown in FIG. 14, the data relay device 130 recognizes the transmission/reception port 7b1 and the transmission/reception port 7b2 as the logical port 120, and includes a logical-port-management-table storage unit 180 that stores therein a logical-port management table 180a. In the logical-port management table 180a, the transmission/reception-port ID "P1" indicating the transmission/reception port 7b1 is associated with the logical-port ID "L1" indicating the logical port 120, and the transmission/reception-port ID "P2" indicating the transmission/reception port 7b2 is associated with the logical-port ID "L1" indicating the logical port 120.

The data relay device 130 reads a source address from data received on a transmission/reception port. When the source address is not contained in the destination-logical port association table, the data relay device 130 reads a logical-port ID from a transmission port-logical port association table using a transmission/reception-port ID that uniquely identifies the transmission/reception port on which the data is received. The data relay device 130 registers the source address as a destination address with the logical-port ID associated therewith in the destination-logical port association table.

For example, the data relay device 130 reads a source MAC address "00-E0-00-00-12-04" from a frame 8b received on the transmission/reception port 7b1 using a switch unit 170, and searches a MAC learning table 140a stored in a MAC-learning-table storage unit 140 for the source MAC address. When the search results in that the source MAC address "00-E0-00-00-12-04" is not contained in the MAC learning table 140a, the data relay device 130 reads the logical-port ID "L1" from the logical-port management table 180a based on the transmission/reception-port ID "P1" indicating the transmission/reception port 7b1, on which the frame 8b is received. The data relay device 130 then registers the source MAC address "00-E0-00-00-12-04" with the logical-port ID "L1" associated therewith in a MAC learning table 140b.

As described above, the data relay device 130 allows easy creation of a table in which destination addresses and logical-port IDs are associated with each other.

Figure 15:
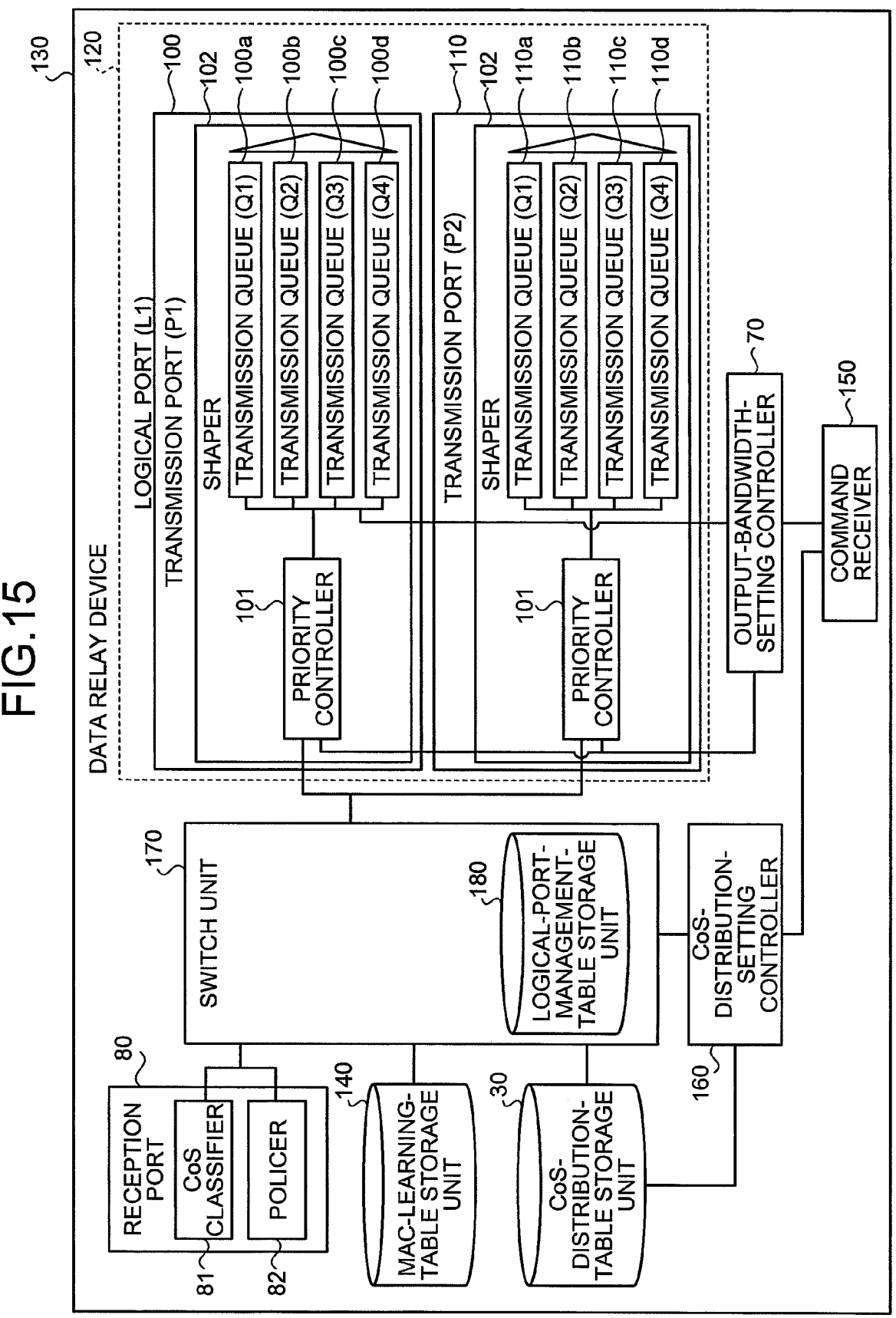
FIG. 15 is a block diagram of the data relay device shown in FIG. 14.

FIG. 15 is a block diagram of the data relay device 130. The data relay device 130 includes the CoS-distribution-table storage unit 30, the MAC-learning-table storage unit 140, a command receiver 150, a CoS-distribution-setting controller 160, the output-bandwidth-setting controller 70, the reception port 80, the switch unit 170, the transmission port 100, and the transmission port 110. The reception port 80 includes the CoS classifier 81 and the policer 82. The transmission port 100 includes the priority controller 101 and the shaper 102. The shaper 102 has the transmission queues 100a to 100d. Similarly, the transmission port 110 includes the priority controller 101 and the shaper 102. The shaper 102 has the transmission queues 110a to 110d. The switch unit 170 includes the logical-port-management-table storage unit 180.

The data relay device 130 recognizes the transmission ports 100 and 110 as the logical port 120. Although not shown in FIG. 15, the data relay device 130 includes, in addition to the reception port 80 and the transmission ports 100 and 110, a plurality of reception ports and transmission ports. Like reference characters refer to like elements as those in the first embodiment, and the same explanations are not repeated. It should be noted that, in the second embodiment, the transmission port 100 (110) is capable of functioning as a reception port, and the reception port 80 is similarly capable of functioning as a transmission port.

Figure 16:
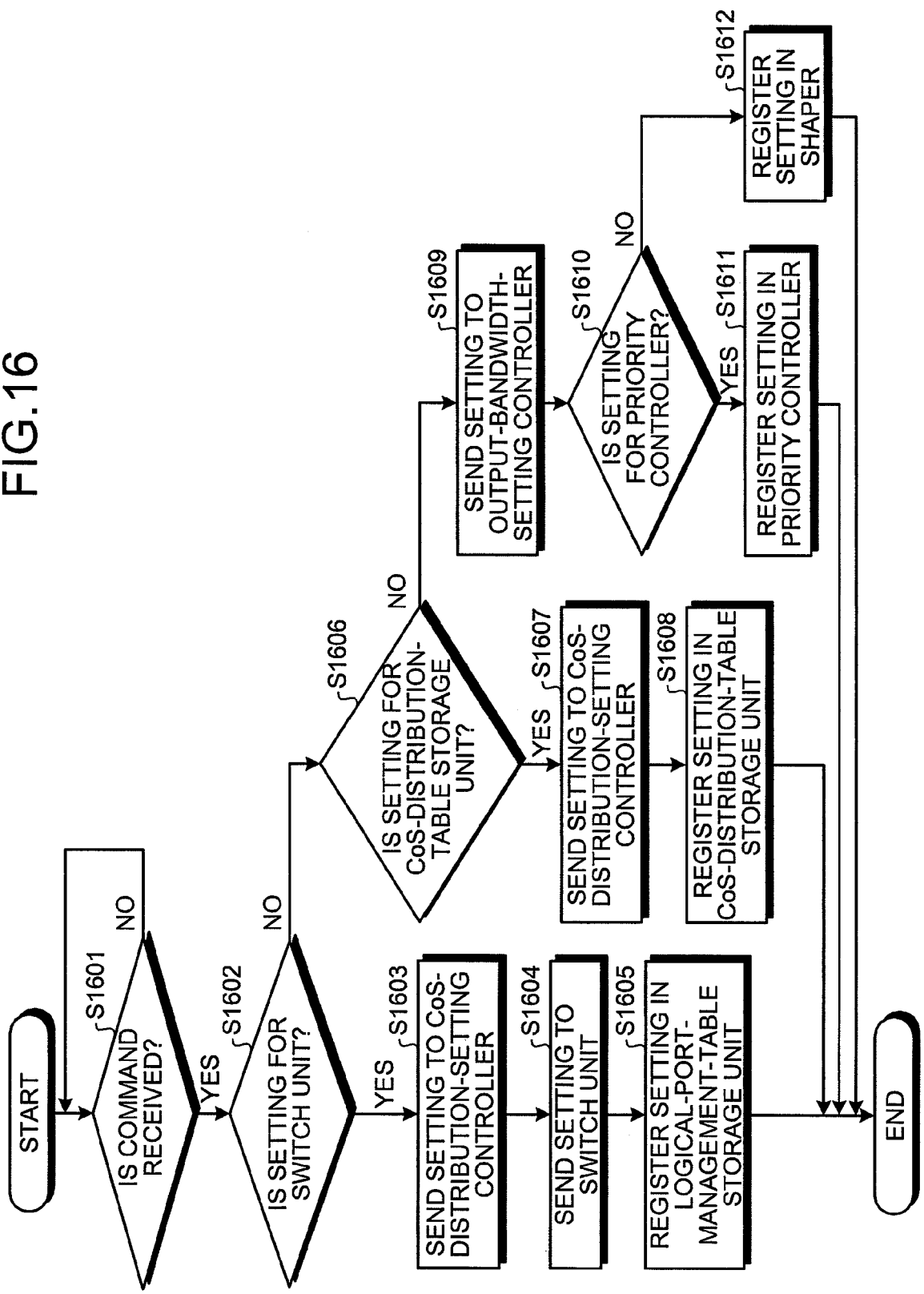
FIG. 16 is a flowchart of a process procedure to register a setting according to the second embodiment.
Figure 17:
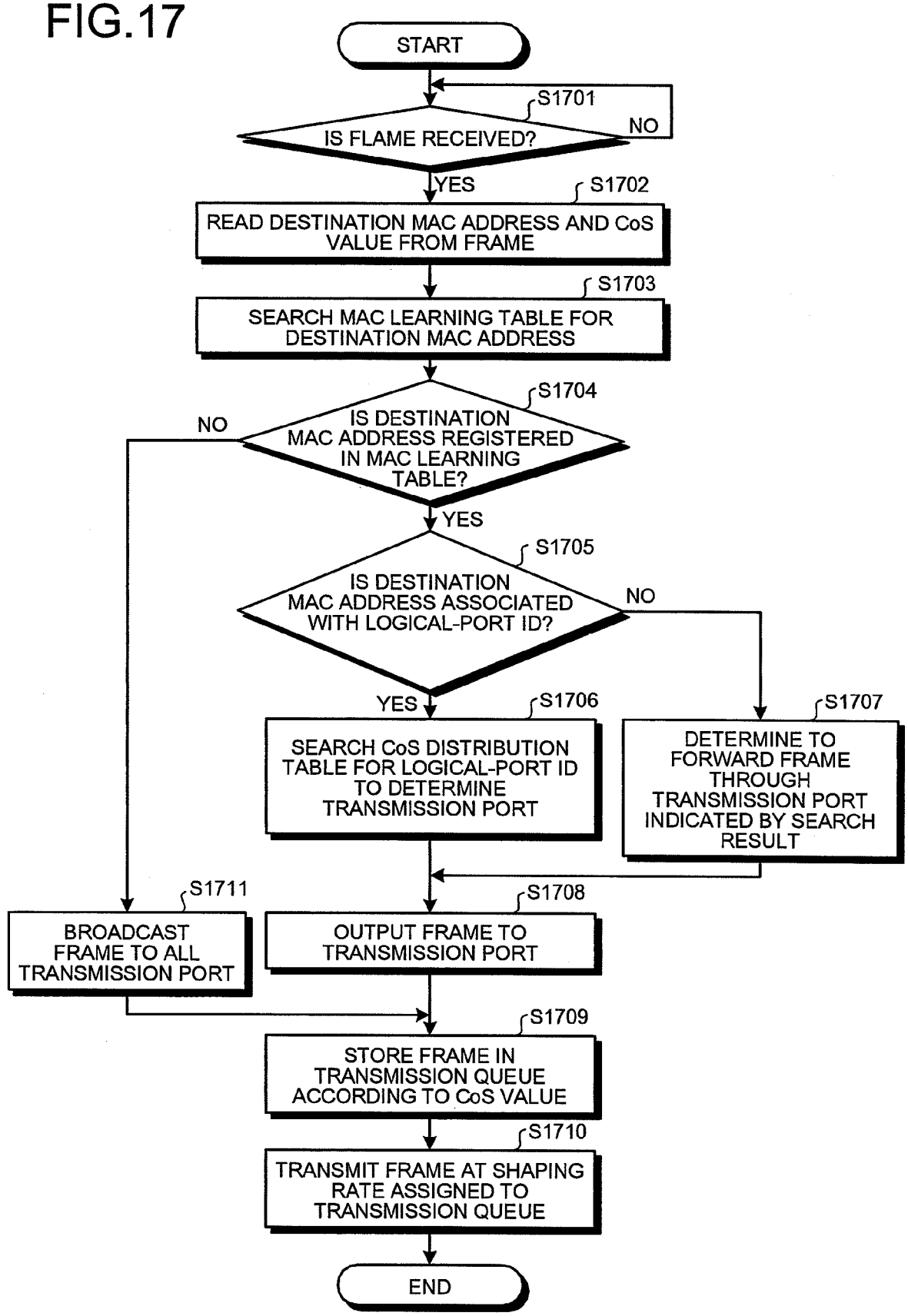
FIG. 17 is a flowchart of a process procedure for frame transmission/reception according to the second embodiment.
Figure 18:
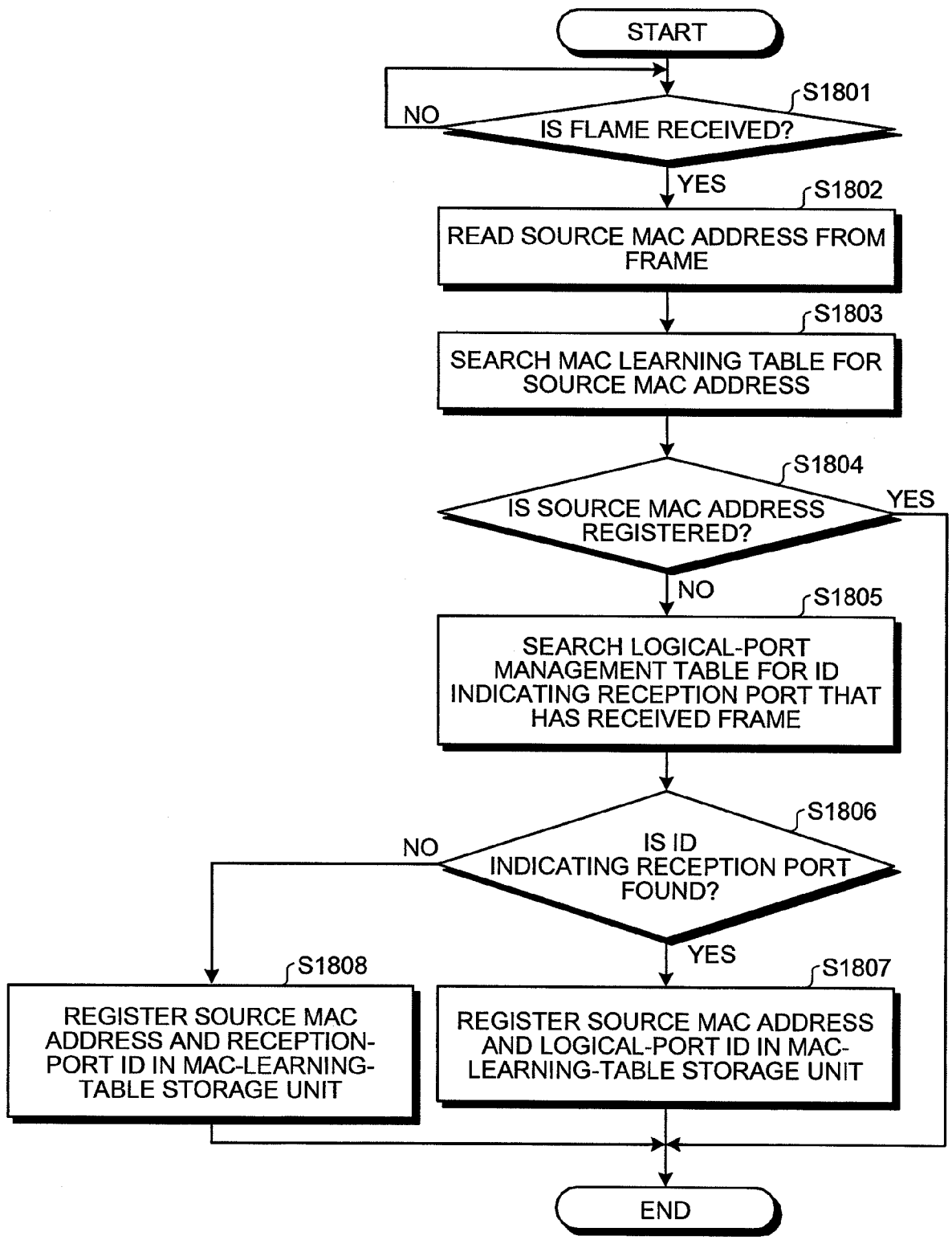
FIG. 18 is a flowchart of a process procedure to register a MAC address in a MAC-learning-table storage unit shown in FIG. 14.

With reference to FIGS. 16 to 18, the operation of the data relay device 130 and details of the MAC-learning-table storage unit 140, the command receiver 150, the CoS-distribution-setting controller 160, the switch unit 170, and the logical-port-management-table storage unit 180 are described below.

FIG. 16 is a flowchart of a process procedure to register a setting. Upon receipt of a command that specifies a setting (YES at step S1601), the command receiver 150 determines whether the setting is for the switch unit 170 (step S1602). When the setting is for the switch unit 170 (e.g., integrating the transmission ports 100 and 110 into the logical port 120) (YES at step S1602), the command receiver 150 sends the setting for the switch unit 170 to the CoS-distribution-setting controller 160 (step S1603). Upon receipt of the setting, the CoS-distribution-setting controller 160 sends the setting to the switch unit 170 (step S1604). The switch unit 170 registers various sets of information based on the setting in the logical-port-management-table storage unit 180 (step S1605).

When the setting is not for the switch unit 170 (NO at step S1602), the same process as described previously in the first embodiment is performed by the command receiver 150, the CoS-distribution-setting controller 160, and the output-bandwidth-setting controller 70.

FIG. 17 is a flowchart of a process procedure for frame transmission/reception. When the reception port 80 receives a frame (YES at step S1701), the CoS classifier 81 sends the frame to the switch unit 170. Upon receipt of the frame, the switch unit 170 reads a destination MAC address and a CoS value from the frame (step S1702), and searches the MAC learning table stored in the MAC-learning-table storage unit 140 for the destination MAC address (step S1703).

In contrast with that of the first embodiment, an associated pair of a MAC address of each terminal in the network and the ID of a logical port through which a frame containing the MAC address is to be forwarded is not registered in the MAC learning table stored in the MAC-learning-table storage unit 140 in advance. Hence, a process to handle an unregistered destination MAC addresses is required.

More specifically, when the search through the MAC learning table results in that the destination MAC address is not registered in the MAC learning table (NO at step S1704), the switch unit 170 broadcasts the frame to all the transmission ports (step S1711). When the search through the MAC learning table results in that the destination MAC address is registered in the MAC learning table (YES at step S1704), the same process as described previously in the first embodiment is performed by the switch unit 170, the priority controller 101, and the shaper 102.

FIG. 18 is a flowchart of a process procedure to register a MAC address in the MAC-learning-table storage unit 140. Upon receipt of a frame (YES step S1801), the switch unit 170 reads a source MAC address from the frame (step S1802), and searches the MAC learning table for the source MAC address (step S1803).

When the source MAC address is not registered in the MAC learning table (NO at step S1804), the switch unit 170 searches the logical-port management table for a reception-port ID (transmission/reception-port ID) indicating the reception port (transmission/reception-port) on which the frame has been received (step S1805). When the reception-port ID is found (YES at step S1806), the switch unit 170 registers a logical-port ID associated with the reception-port ID, and the source MAC address in the MAC-learning-table storage unit 140 (step S1807). When the reception-port ID is not found (NO at step S1806), the switch unit 170 registers the reception-port ID and the source MAC address in the MAC-learning-table storage unit 140 (step S1808), and the process ends. Meanwhile, when the source MAC address has already been registered in the MAC learning table (YES at step S1804), the process ends.

As described above, according to the second embodiment, a transmission port functions also as a reception port to receive data. The data relay device stores therein the logical-port management table in which, for each logical port formed by integrating two or more transmission ports, transmission-port IDs and a logical-port ID are associated with each other. Each transmission-port ID uniquely identifies a transmission port, and the logical-port ID uniquely identifies the logical port. The data relay device reads a source MAC address from data received on a transmission port. When the source MAC address is not contained in the MAC learning table, the data relay device reads, based on a transmission-port ID that uniquely identifies the transmission port, a logical-port ID associated with the transmission-port ID from the logical-port management table. The data relay device registers the source MAC address as a destination MAC address with the logical-port ID associated therewith in the MAC learning table. Hence, a table in which destination addresses and logical-port IDs are associated can be created easily.

The above-described embodiments are susceptible to various modifications and alternative forms. Examples of the modifications are described below.

In the first embodiment, a logical port is divided into classes of a number equal to the total number of transmission queues included in transmission ports in the logical port. However, the classes can be of any number so long as not exceeding the total number of the transmission queues. For example, when the logical port is formed with two transmission ports each including four transmission queues, the logical port has eight transmission queues. Hence, the logical port can be divided into, for example, seven classes, which is not greater than eight.

In the first embodiment, transmission-port IDs are cyclically assigned in order of CoS values. However, transmission-port IDs are not necessarily assigned according to a given regularity. For example, the transmission-port ID "P1" can be assigned to the CoS values "0", "3", "4", and "7". Similarly, the transmission-port ID "P2" can be assigned the CoS values "1", "2", "5", and "6". When assignment of IDs are changed, shaping rates for transmission queues at a transmission port are desirably changed to adapt to the assigning.

The constituent elements of the respective devices shown in the drawings are functionally conceptual, and need not be physically configured as illustrated. The constituent elements, as a whole or in part, can be divided or integrated either functionally or physically based on various types of loads or use conditions. For example, the command receiver 50, the CoS-distribution-setting controller 60, and the output-bandwidth-setting controller 70 can be integrated into one unit. The process functions performed by the device are entirely or partially realized by a central processing unit (CPU) or computer programs analyzed and executed by the CPU, or realized as hardware by wired logic.

The process procedures, specific names, information (such as the transmission-port IDs "P1" and "P2") including various data and parameters described in the embodiments or shown in the drawings can be arbitrarily changed as necessary unless otherwise specified.

In the first embodiment, various processes are explained as being implemented by wired logic; however, the processes can be implemented by a pre-prepared computer program. In other words, a computer program (hereinafter, a data relay program) can be executed on a computer to realize the same function as the data relay device 10. In the following, such a computer is explained with reference to FIG. 19.

Figure 19:
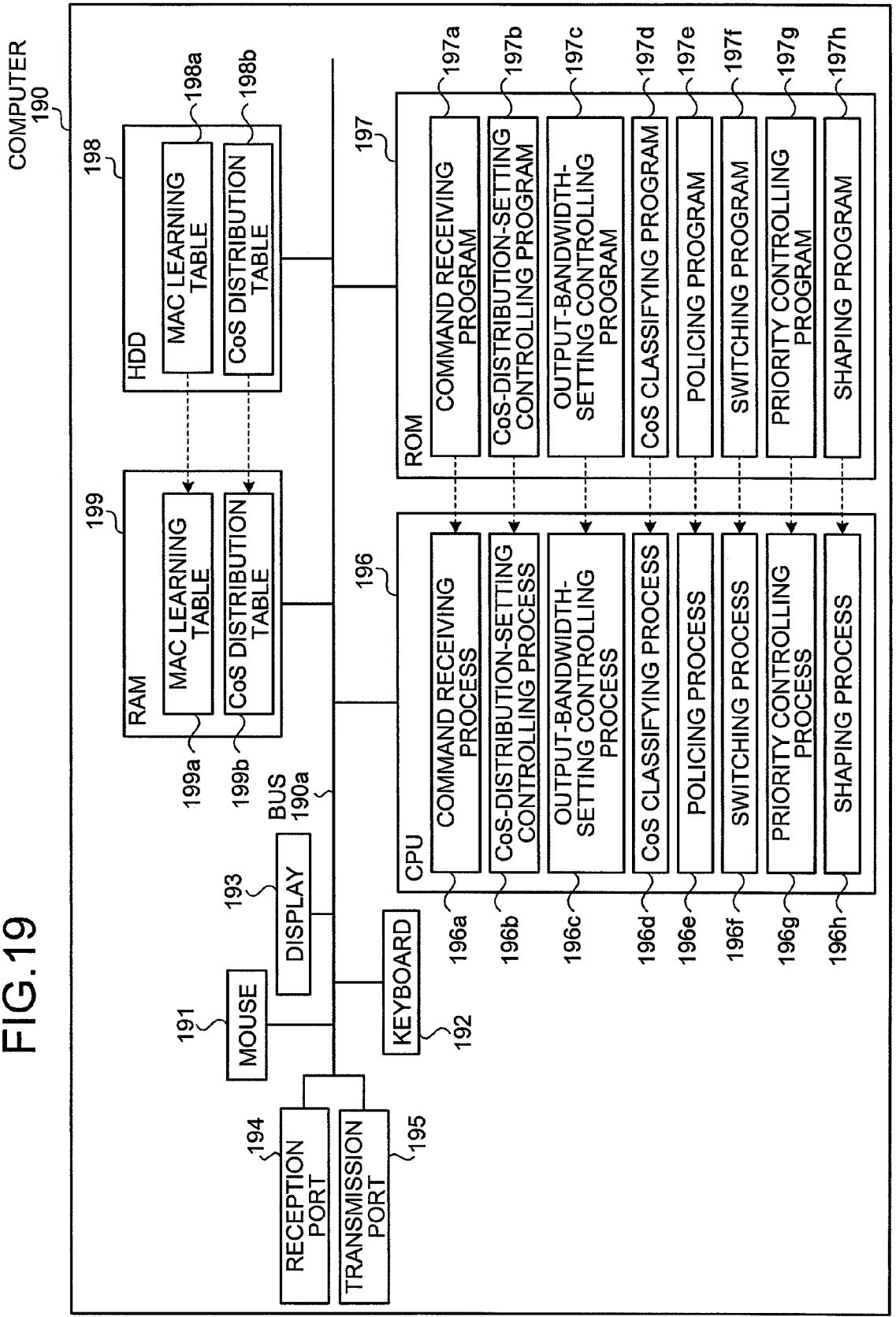
FIG. 19 is a block diagram of a computer that executes a data relay program.

FIG. 19 is a block diagram of a computer 190 that executes the data relay program. The computer 190 includes a mouse 191, a keyboard 192, a display 193, a reception port 194, a transmission port 195, a CPU 196, a read only memory (ROM) 197, a hard disk drive (HDD) 198, and a random access memory (RAM) 199, which are connected to one another via a bus 190a.

The ROM 197 stores therein the data relay program. More specifically, as shown in FIG. 19, a command receiving program 197a, a CoS-distribution-setting controlling program 197b, an output-bandwidth-setting controlling program 197c, a CoS classifying program 197d, a policing program 197e, a switching program 197f, a priority controlling program 197g, and a shaping program 197h are stored in the ROM 197 in advance. The programs 197a to 197h can be integrated or distributed as required as in the case of the constituent elements of the data relay device 10.

The CPU 196 reads the programs 197a to 197h from the ROM 197 and executes them. Hence, the programs 197a to 197h function as a command receiving process 196a, a CoS-distribution-setting controlling process 196b, an output-bandwidth-setting controlling process 196c, a CoS classifying process 196d, a policing process 196e, a switching process 196f, a priority controlling process 196g, and a shaping process 196h. The processes 196a, 196b, 196c, 196d, 196e, 196f, 196g, and 196h correspond to the command receiver 50, the CoS-distribution-setting controller 60, the output-bandwidth-setting controller 70, the switch unit 90, the CoS classifier 81, the policer 82, the priority controller 101, and the shaper 102, respectively.

The HDD 198 stores therein a MAC learning table 198a and a CoS distribution table 198b as shown in FIG. 19. The MAC learning table 198a and the CoS distribution table 198b correspond to the MAC-learning-table storage unit 40 and the CoS-distribution-table storage unit 30, respectively.

The CPU 196 reads the MAC learning table 198a and the CoS distribution table 198b to store them in the RAM 199, and performs data forwarding based on MAC learning data 199a and CoS distribution data 199b stored in the RAM 199.

The programs 197a to 197h are not necessarily stored in the ROM 197 in advance. The programs 197a to 197h can be stored in a portable physical medium that is configured to be connected to the computer 190 or a fixed physical medium provided inside or outside the computer 190.

Examples of the portable physical medium include a flexible disk (FD), a compact disc read-only memory (CD-ROM), a magneto optical (MO) disk, a digital versatile disc (DVD), a magnetic optical disk, and an integrated circuit (IC) card. Examples of the fixed physical medium include a HDD. The programs 197a to 197h can also be stored in another computer (or a server) connected to the computer 190 via a public line, the Internet, a LAN, or a wide area network (WAN) so that the computer 190 downloads the programs for execution.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network data relay device comprising:
a receiver that receives data from the network containing a destination address indicating a destination of the data and a priority value indicating priority of the data;
a first transmission port that includes a plurality of first transmission queues each assigned different priority values and a first controller to allocate the data to one of the first transmission queues corresponding to the priority value of the data;
a second transmission port that forms a logical port in conjunction with the first transmission port, and includes a plurality of second transmission queues each assigned different priority values and a second controller to allocate the data to one of the second transmission queues corresponding to the priority value of the data, any of the priority values assigned to the second transmission queues being different from all of the priority values assigned to the first transmission queues;

a switch that outputs the data received to the first transmission port or the second transmission port according to the destination address and the priority value of the data; and a transmission controller that controls transmission of the data stored in the first transmission queues and the second transmission queues according to the priority values assigned to the first transmission queues and the second transmission queues.

2. The data relay device according to claim 1, wherein the priority values are cyclically assigned to the first transmission queues and the second transmission queues.

3. The data relay device according to claim 1, wherein the receiver includes a reception port to receive data, the data relay device further comprising:
   a storage that stores therein an association table that contains an identification of the reception port in association with an identification of the logical port; and
   a register that reads a source address from data received, and, when the source address is not associated with any identification of the logical port, reads the identification of the logical port associated with the identification of the reception port from the association table, and registers the source address as a destination address in association with the identification of the logical port.

4. The data relay device according to claim 1, wherein
   the first transmission port includes the first transmission queues each assigned odd priority values, and
   the second transmission port includes the second transmission queues each assigned even priority values.

5. A network data relay method comprising:
   grouping a first transmission port and a second transmission port to form a logical port, the first transmission port including a plurality of first transmission queues each assigned different priority values, the second transmission port including a plurality of second transmission queues each assigned different priority values, any of the priority values assigned to the second transmission queues being different from all of the priority values assigned to the first transmission queues;
   receiving data from the network containing a destination address indicating a destination of the data and a priority value indicating priority of the data;
   outputting the data received to the first transmission port or the second transmission port according to the destination address and the priority value of the data;
   allocating the data output to the first transmission port to one of the first transmission queues corresponding to the priority value of the data;
   allocating the data output to the second transmission port to one of the second transmission queues corresponding to the priority value of the data; and
   controlling transmission of the data stored in the first transmission queues and the second transmission queues according to the priority values assigned to the first transmission queues and the second transmission queues.

6. A non-transitory computer-readable physical recording medium that stores therein a computer program for relaying data in a network, the computer program causing a computer to execute:
   grouping a first transmission port and a second transmission port to form a logical port, the first transmission port including a plurality of first transmission queues each assigned different priority values, the second transmission port including a plurality of second transmission queues each assigned different priority values, any of the priority values assigned to the second transmission queues being different from all of the priority values assigned to the first transmission queues;
   receiving data from the network containing a destination address indicating a destination of the data and a priority value indicating priority of the data;
   outputting the data received to the first transmission port or the second transmission port according to the destination address and the priority value of the data;
   allocating the data output to the first transmission port to one of the first transmission queues corresponding to the priority value of the data;
   allocating the data output to the second transmission port to one of the second transmission queues corresponding to the priority value of the data; and
   controlling transmission of the data stored in the first transmission queues and the second transmission queues according to the priority values assigned to the first transmission queues and the second transmission queues.

* * * * *